U S009337458B2

(12) United States Patent
    Kim

(10) Patent No.: US 9,337,458 B2
(45) Date of Patent: May 10, 2016

(54) BATTERY MODULE

(75) Inventor: Myung-Chul Kim, Yongin-si (KR)

(73) Assignees: Samsung SDI CO., Ltd., Yongin-si (KR); Robert Bosch Gmbh, Stuttgart (DE)

( * ) Notice: Subject to any disclaimer, the term of this patent is extended or adjusted under 35 U.S.C. 154(b) by 599 days.

(21) Appl. No.: 13/364,777

(22) Filed: Feb. 2, 2012

(65) Prior Publication Data

US 2013/0052516 A1     Feb. 28, 2013

(30) Foreign Application Priority Data

Aug. 22, 2011  (KR) .................. 10-2011-0083485

(51) Int. Cl.
    H01M 2/10    (2006.01)
    H01M 6/46    (2006.01)

(52) U.S. Cl.
    CPC .......... H01M 2/1077 (2013.01); H01M 2/1016 (2013.01); H01M 6/46 (2013.01)

(58) Field of Classification Search
    CPC .................. H01M 2/1077; H01M 2/0245
    USPC ......... 429/151, 100, 159, 153, 154, 163, 175, 429/176, 96, 99
    See application file for complete search history.

(56) References Cited

U.S. PATENT DOCUMENTS

| 3,457,119 | A  | * | 7/1969  | Tench ............................. | 429/82 |
| 8,722,223 | B2 | * | 5/2014  | Yang et al. ..................... | 429/72 |
| 9,005,796 | B2 |   | 4/2015  | Shishido et al. | |
| 2008/0318119 | A1 | | 12/2008 | Watanabe et al. | |
| 2010/0119931 | A1 | | 5/2010  | Shishido et al. | |
| 2011/0104543 | A1 | | 5/2011  | Kim et al. | |
| 2011/0151311 | A1 | | 6/2011  | Lee et al. | |
| 2011/0165451 | A1 | | 7/2011  | Kim et al. | |
| 2011/0195284 | A1 | | 8/2011  | Yasui et al. | |
| 2013/0330587 | A1 | | 12/2013 | Takahashi et al. | |

FOREIGN PATENT DOCUMENTS

| CN | 101573809 A | 11/2009 |
| CN | 102117930 A | 7/2011 |
| JP | 49-67129 U | 9/1974 |
| JP | 11-25947 | 1/1999 |
| JP | 11025947 | * 1/1999 |
| JP | 2001-236937 | 8/2001 |
| JP | 2006-236826 | 9/2006 |

(Continued)

OTHER PUBLICATIONS

KIPO Notice of Allowance dated Jun. 28, 2013, for Korean priority Patent application 10-2011-0083485, (1 page).

(Continued)

*Primary Examiner* — Ula C Ruddock
*Assistant Examiner* — Thomas Parsons
(74) *Attorney, Agent, or Firm* — Lewis Roca Rothgerber Christie LLP (57) ABSTRACT

A battery module including a pair of end plates; a plurality of battery cells aligned between the pair of end plates in a direction; a top plate at an upper portion of the plurality of battery cells; a bottom plate at a lower portion of the plurality of battery cells; a housing accommodating the plurality of battery cells with the pair of end plates, the top plate, and the bottom plate, and at least one reinforcement member between battery cells of the plurality of battery cells, the at least one reinforcement member including at least one fixation unit.

17 Claims, 6 Drawing Sheets

(56) References Cited

FOREIGN PATENT DOCUMENTS

| | | |
|---|---|---|
| JP | 2007-299544 | 11/2007 |
| JP | 2008-123846 | 5/2008 |
| JP | 2008-130374 | 6/2008 |
| JP | 2010-140695 | 6/2010 |
| JP | 2010-211952 | 9/2010 |
| JP | 2010-251019 | 11/2010 |
| JP | 2010-272517 | 12/2010 |
| KR | 2000-0016883 U | 9/2000 |
| KR | 10-2006-0085775 | 7/2006 |
| KR | 2007-0104692 A | 10/2007 |
| KR | 10-2011-0073221 | 6/2011 |
| WO | WO 2010/067602 A1 | 6/2010 |
| WO | WO 2012/066875 A1 | 5/2012 |

OTHER PUBLICATIONS

Extended European Search Report for corresponding EP Application No. 12166203.5, dated Nov. 20, 2012 (6 sheets).

KIPO Office action dated Nov. 30, 2012 for corresponding KR-10-2011-0083485, 4 pages.

JPO Office action dated Oct. 27, 2015, for corresponding Japanese Patent application 2011-262183, (5 pages).

SIPO Office action dated Oct. 28, 2015, with English translation, for corresponding Chinese Patent application 201210068886.4, (14 pages).

English machine translation of line 17 on p. 3, to line 8 on p. 4, of Japanese Publication 49-067129 dated Sep. 22, 1974, (1 page).

* cited by examiner

BATTERY MODULE

CROSS-REFERENCE TO RELATED APPLICATION

This application claims priority to and the benefit of Korean Patent Application No. 10-2011-0083485, filed on Aug. 22, 2011 in the Korean Intellectual Property Office, the entire content of which is incorporated herein by reference.

BACKGROUND

1. Field

Aspects of embodiments of the present invention relate to a battery module.

2. Description of the Related Art

Typically, battery cells are used in mobile devices, electric vehicles, hybrid vehicles, and the like as an energy source, such as electric power, and the battery cells may have a shape depending on the types of applied external devices.

Small mobile devices such as mobile phones can be operated for a predetermined time by output and capacity of single battery cell. However, in applications such as electric vehicles and hybrid vehicles which require more power, when high power driving is required for a long time, a high-capacity battery module is configured by connecting a plurality of battery cells in order to increase output and capacity. The battery module can increase the output voltage or the output current according to the number of battery cells included therein. In addition, a battery pack can be configured by electrically connecting a plurality of battery modules.

Typically, when the number of the battery cells is greater, the length of the battery module is longer. In addition, when vibration or impact is applied to a conventional battery module, there are problems that the middle of the battery module is floated and the battery module may be damaged.

SUMMARY

According to an aspect of the present invention, a battery module is configured to prevent or substantially prevent drooping or sagging of the middle of the battery module by vibration or impact by inserting a reinforcement member into the battery module configured with a plurality of battery cells. As such, a battery module according to embodiments of the present invention is particularly suited for application in an electric vehicle or a hybrid electric vehicle.

According to an embodiment of the present invention, a battery module includes: a pair of end plates; a plurality of battery cells aligned between the pair of end plates in a direction; a top plate at an upper portion of the plurality of battery cells; a bottom plate at a lower portion of the plurality of battery cells; a housing accommodating the plurality of battery cells with the pair of end plates, the top plate, and the bottom plate, and at least one reinforcement member between battery cells of the plurality of battery cells, the at least one reinforcement member including at least one fixation unit.

The at least one fixation unit of the at least one reinforcement member may be fixed to the housing.

The at least one reinforcement member may be located at a middle part of the battery module.

The at least one reinforcement member may include a surface contacted with the battery cells and having a substantially same size as the battery cells, and the at least one reinforcement member may further include at least one insertion hole having a constant thickness and which is penetrated from an upper surface to a lower surface of the at least one reinforcement member.

Opposite side surfaces and a lower surface of the at least one reinforcement member may extend to portions of lower surfaces and opposite side surfaces of the battery cells contacted with the at least one reinforcement member.

The at least one fixation unit may be located at a bottom part of the at least one insertion hole.

The at least one reinforcement member and the housing may be fixed through a first fixation member.

The bottom plate corresponding to the at least one fixation unit may have a through-hole through which the first fixation member is penetrated.

The first fixation member may include a bolt or a stud.

The top plate may include a top base unit facing upper surfaces of the battery cells, and a top flange unit bent from a side surface of the top base unit toward side surfaces of the battery cells.

The at least one reinforcement member may include a projection unit on a side surface of the at least one reinforcement member contacted with the top flange unit.

The top flange unit corresponding to the projection unit may have a projection accommodation unit which accommodates the projection unit.

The projection unit may have a tapered shape toward the lower portion.

The bottom plate may include a bottom base unit facing lower surfaces of the battery cells, and a bottom flange unit bent from a side surface of the bottom base unit to side surfaces of the battery cells.

The at least one reinforcement member may include a coupling groove formed on a side surface of the at least one reinforcement member contacted with the bottom flange unit.

The bottom flange unit corresponding to the coupling groove may have a coupling hole.

The side surface of the at least one reinforcement member and the bottom flange unit may be fixed at the coupling groove and the coupling hole by a second fixation member.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

In the following detailed description, some exemplary embodiments of the present invention are shown and described, by way of illustration. However, as those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or may be indirectly on the another element with one or more intervening elements interposed therebetween. Also, when an element is referred to as being "connected to" another element, it can be directly connected to the another element or may be indirectly connected to the another element with one or more intervening elements interposed therebetween. Hereinafter, like reference numerals refer to like elements.

Certain embodiments of the present invention are described herein with reference to the accompanying drawings. However, the present invention may be implemented in various different forms within the scope of the claims, and the embodiments described herein are to be regarded as illustrative, rather than restrictive.

In the description below, some detailed description of functions or configurations may be omitted where such would be known to those of ordinary skill in the art, such that unnecessary description may not make unclear the technical principles of the present invention. In the drawings, where the same components are shown in several drawings, the same reference numerals may be repeated. Further, sizes or thicknesses shown in the drawings may be exaggerated and not to scale for convenience or purposes of illustration, and the actual sizes or thicknesses may be different.

Figure 1:
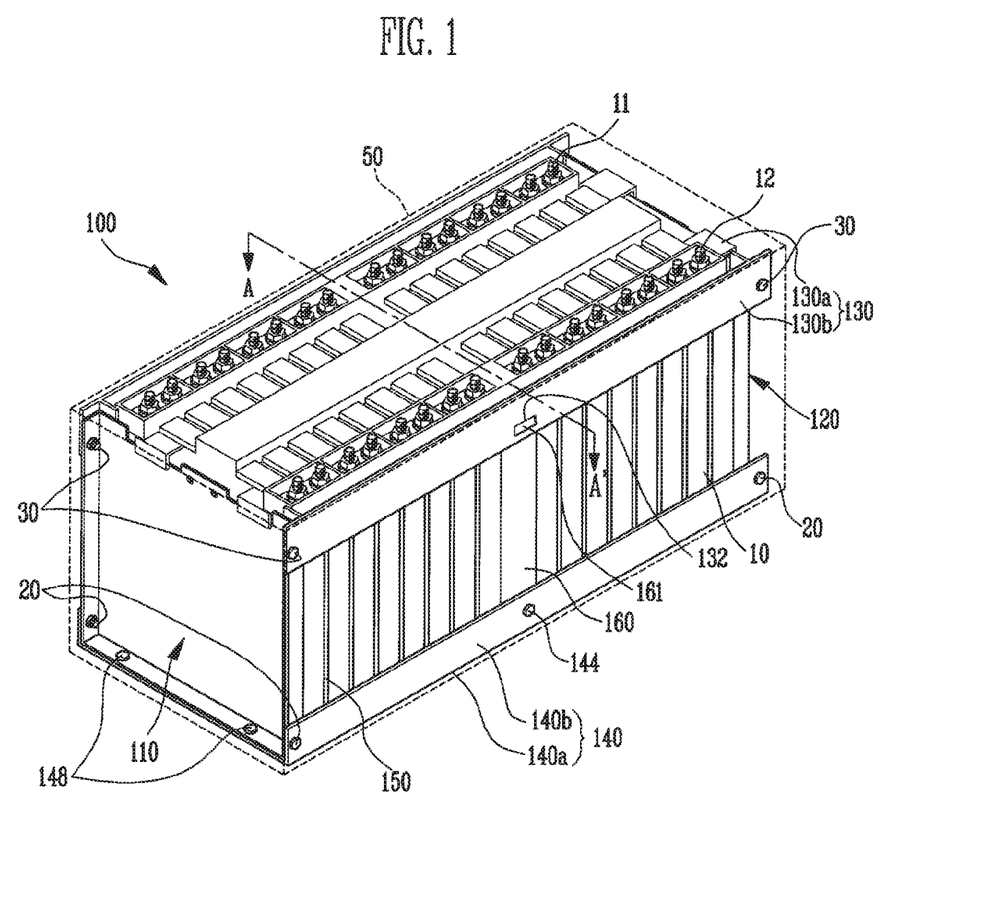
FIG. 1 is a perspective view of a battery module according to an embodiment of the present invention.
Figure 2:
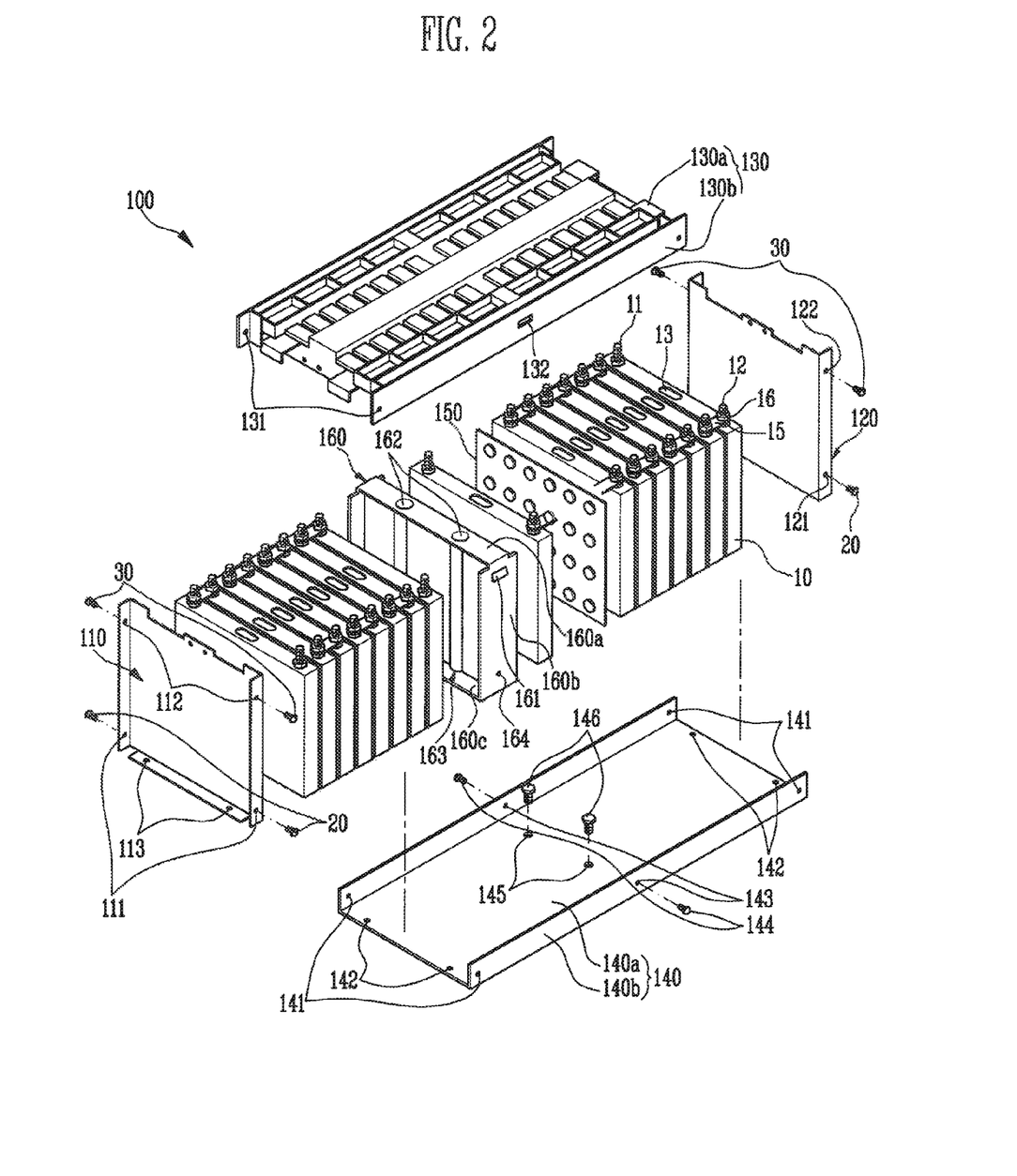
FIG. 2 is an exploded perspective view of the battery module of FIG. 1.

FIG. 1 is a perspective view of a battery module according to an embodiment of the present invention; and FIG. 2 is an exploded perspective view of the battery module of FIG. 1.

Referring to FIGS. 1 and 2, according to an embodiment of the present invention, a battery module 100 includes a plurality of battery cells 10, a pair of end plates 110, 120, a top plate 130, a bottom plate 140, and a housing 50 which accommodates the above-mentioned components. In addition, at least one reinforcement member 160 is further provided between the plurality of battery cells 10.

According to an embodiment of the present invention, the reinforcement member 160 is located at or near a middle portion of the battery module 100 and fixed to a bottom portion of the housing 50. As such, the battery module 100 can be manufactured with more robustness since a droop or sag of a middle part of the battery module 100 due to vibration or impact is prevented or substantially prevented. In addition, where a length of the battery module 100 including a plurality of battery cells 10 is long, a droop or sag of the middle part due to the weight of the battery module 100 itself is prevented or substantially prevented.

The reinforcement member 160, in one embodiment, has a constant thickness and is formed such that the surface contacted with the battery cell 10 has a same size as the battery cell 10. In addition, the reinforcement member 160 is formed with an insertion hole 162 penetrated from an upper surface 160a to a lower surface 160c. The insertion hole 162 is a space in which a tool 170 (see FIG. 5) can be inserted when the reinforcement member 160 is fixed to the housing 50 by using a first fixation member 146. This will be described in further detail later herein with respect to FIG. 5.

In one embodiment, both side surfaces 160b and the lower surface 160c of the reinforcement member 160 may be extended and formed. Both side surfaces 160b and the lower surface 160c of the reinforcement member 160 may be extended and formed to accommodate a portion of the lower surface and the side surface of both battery cells 10 contacted with the reinforcement member 160. Thereby, since portions of both battery cells 10 contacted with the reinforcement member 160 are accommodated in the reinforcement member 160, the battery cells 10 can be stably mounted in the battery module 100 without shaking even when a fixation unit is released.

In one embodiment, a fixation unit 163 of the reinforcement member 160 is located on the bottom part of the insertion hole 162. That is, in the reinforcement member 160, the first fixation member 146 is inserted through the insertion hole 162 and the first fixation member 146 may be fixed to the housing 50. In one embodiment, a bottom base unit 140a of the bottom plate 140 corresponding to the fixation unit 163 is provided with a through-hole 145 through which the first fixation member 146 is penetrated. Here, the first fixation member 146 may include a bolt or a stud.

In one embodiment, the reinforcement member 160 may also be fixed to the top plate 130 and the bottom plate 140. In one embodiment, the top plate 130 may include a top base unit 130a disposed to face the upper surfaces of the battery cells 10, and top flange units 130b bent from sides of the top base unit 130a to the side surfaces of the battery cells 10. In one embodiment, the bottom plate 140 may include a bottom base unit 140a disposed to face the lower surfaces of the battery cells 10, and bottom flange units 140b bent from sides of the bottom base unit 140a to the side surfaces of the battery cells 10.

The top flange unit 130b and the bottom flange unit 140b may be bent to be approximately perpendicular to the top base unit 130a and the bottom base unit 140a, respectively. In one embodiment, the top flange unit 130b and the bottom flange unit 140b may be extended to be contacted with the side surfaces of the battery cells 10.

In one embodiment, both side surfaces 160b of the reinforcement member 160 contacted with the top flange unit 130b of the top plate 130 are formed with a projection unit 161. Further, the top flange unit 130b corresponding to the projection unit 161 is provided with a projection accommodation unit 132 which accommodates the projection unit 161. In one embodiment, the projection unit 161 is formed having a tapered shape toward the lower part, and the projection unit 161 formed having a tapered shape is inserted in the projection accommodation unit 132 which is an opening in the top flange unit 130b. Thereby, the reinforcement member 160 may be fixed to the top plate 130.

In one embodiment, both side surfaces of the reinforcement member 160 contacted with the bottom flange unit 140b of the bottom plate 140 are formed with a coupling groove 164. Further, the bottom flange unit 140b corresponding to the coupling groove 164 is provided with a coupling hole 143, and the bottom plate 140 and the reinforcement member 160 are fixed by a second fixation member 144 inserted into the coupling groove 164 through the coupling hole 143.

The inside of the coupling groove 164 may be formed in the form of a screw thread, and the second fixation member 144 may be in the form of a bolt or a stud.

In one embodiment, each of the top end and the bottom end of the end plates 110, 120 are fixed to be contacted with the top flange unit 130b and the bottom flange unit 140b, respectively. That is, in one embodiment, both ends of the facing top flange unit 130b are fixed to the end plates 110, 120 by fixation members 30, and both ends of the facing bottom flange unit 140b are fixed to the end plates 110, 120 by fixation members 20.

According to an embodiment of the present invention, the plurality of battery cells 10 aligned between the pair of end plates 110, 120 in one direction may be manufactured by accommodating an electrode assembly and electrolyte in a case and then closing the case with a cap plate. An anode terminal 11, a cathode terminal 12, and a vent 13 provided between the anode and cathode terminals 11, 12 may be formed on the cap plate. The electrode assembly may include an anode plate, a cathode plate, and a separator interposed between the anode plate and the cathode plate.

The anode plate is connected to the anode terminal 11, and the cathode plate is connected to the cathode terminal 12, such that an energy generated by an electrochemical reaction of the electrode assembly and the electrolyte solution is transferred to the outside. In addition, the vent 13 functions as a passage discharging gas generated from the inside of the battery cell 10 to the outside.

The pair of end plates 110, 120, the top plate 130, and the bottom plate 140 may provide a space (e.g., a predetermined space) which accommodates the plurality of battery cells 10. The battery cells 10 may be housed in a partitioned space and may be aligned and fixed in one direction. In this case, the battery cells 10 may be arranged side by side to face one another such that wide front faces of the battery cells 10 are facing each other. In addition, the anode terminal 11 and the cathode terminal 12 of pairs of adjacent battery cells 10 may be electrically connected with each other through a bus bar 15. The bus bar 15 may be provided with holes which may be penetrated by the anode and cathode terminals 11, 12, and, accordingly, the bus bar 15 connected through the penetration may be fixed by a member such as a nut 16.

In one embodiment, the pair of end plates 110, 120 may be arranged to be area-contacted with the outermost of the battery cells 10 to press the inside of the plurality of battery cells 10. In one embodiment, pairs of adjacent battery cells 10 that are not separated by the reinforcement member 160 may be separated by barrier plates 150. In the plurality of battery cells 10 supported by the pair of end plates 110, 120, the top plate 130, and the bottom plate 140, the anode terminals 11 and the cathode terminals 12 may be alternately arranged with each other and connected in series.

In one embodiment, the end plates 110, 120 may include fixation holes 111, 112, 121, 122 in a portion contacted with one end and an opposite end of the top plate 130 and the bottom plate 140. In addition, in the top plate 130 and the bottom plate 140, portions corresponding to the fixation holes 112, 122 and the fixation holes 111, 121, respectively, may be provided with fixation grooves 131 and 141.

The fixation holes 111, 112, 121, 122 and the fixation grooves 131, 141 may be fixed by the fixation members 20, 30. That is, since the fixation members 20, 30 are fixed through the fixation holes 111, 112, 121, 122 and the fixation grooves 131, 141, a coupling force between the pair of end plates 110, 120 and the top and bottom plates 130, 140 may be improved. For example, the fixation members 20, 30 may include a bolt or a stud.

According to the fixation by the fixation holes 111, 112, 121, 122 and the fixation grooves 131, 141, the appearance and miniaturization of the battery module 100 as well as the space utilization may be improved. In addition, since the stress caused by the plurality of battery cells 10 on the top and bottom plates 130, 140 may be effectively distributed by the fixation holes 111, 112, 121, 122 and the fixation grooves 131, 141, the safety of the battery module 100 is improved.

In one embodiment, both ends of the battery module 100, that is, the bottom parts of the end plates 110, 120, are formed with first fixing holes 113 for coupling with the housing 50, and the bottom plate 140, at locations corresponding to the first fixing holes 113, is formed with second fixing holes 142. Thereby, a fixation member 148, such as a bolt or a stud, may penetrate the first fixing hole 113 and the second fixing hole 142 to fix the battery module 100 to the housing 50.

Figure 3:
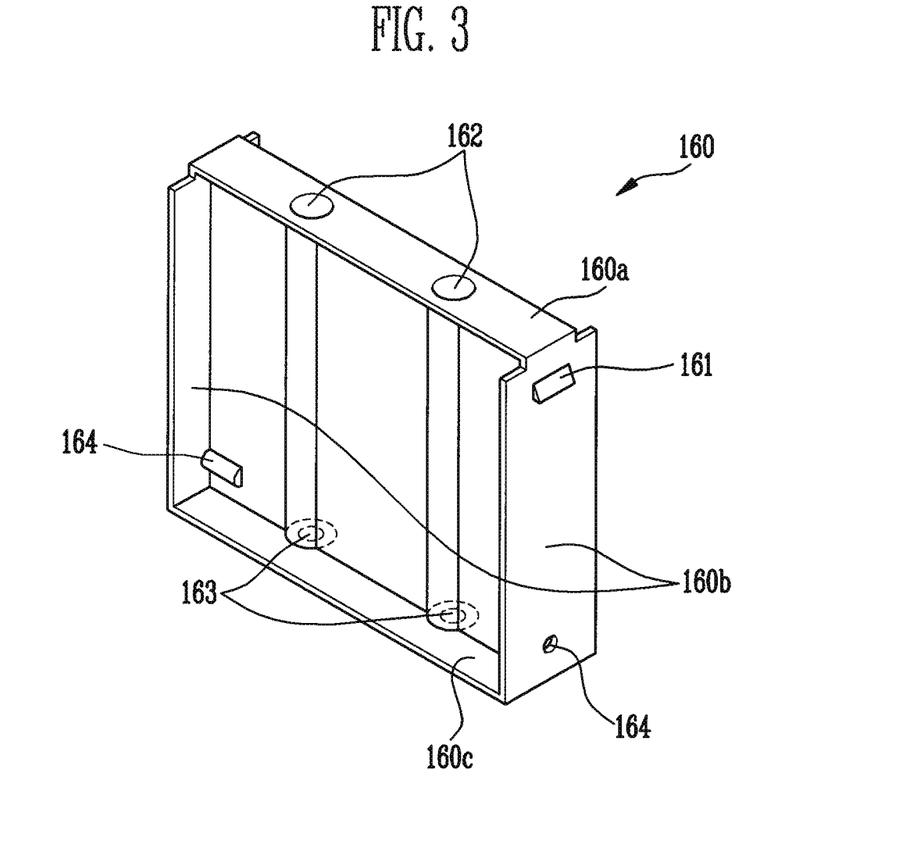
FIG. 3 is a perspective view of a reinforcement member of a battery module according to an embodiment of the present invention.

FIG. 3 is a perspective view of the reinforcement member 160 according to an embodiment of the present invention.

Referring to FIG. 3, in one embodiment, the reinforcement member 160 is formed such that the surfaces contacted with the battery cells 10 have the same size as the battery cells 10 and has a constant thickness. At least one of the insertion holes 162 may be penetrated and formed from the upper surface 160a to the lower surface 160c of the reinforcement member 160.

In one embodiment, two insertion holes 162 are separately formed and spaced apart at an interval (e.g., a predetermined interval). Since the fixation unit 163 formed in the bottom part of the insertion hole 162 is a portion fixed with the housing 50 (see FIG. 1), the fixation force of the housing 50 and the reinforcement member 160 may be improved by forming the insertion hole 162 depending on the width of the reinforcement member 160.

In one embodiment, both of the side surfaces 160b and the lower surface 160c of the reinforcement member 160 may be extended and formed to a portion of the lower surface and the side surfaces of both of the battery cells 10 (see FIG. 1) contacted with the reinforcement member 160. Thereby, since a portion of both of the battery cells 10 is accommodated in the reinforcement member 160, the battery cells 10 can be stably mounted inside the battery module 100 without shaking even when the fixation of the reinforcement member 160 and the housing 50 is released. In addition, the reinforcement member 160 functions to support the battery cells 10 located at the middle part of the battery module 100 due to the extension.

By inserting the reinforcement member 160 into the middle part of the battery module 100 (see FIG. 1), a droop or sag of the middle part of the battery module 100 due to vibration or impact is prevented or substantially prevented, and the battery module 100 has increased robustness.

Figure 4A:
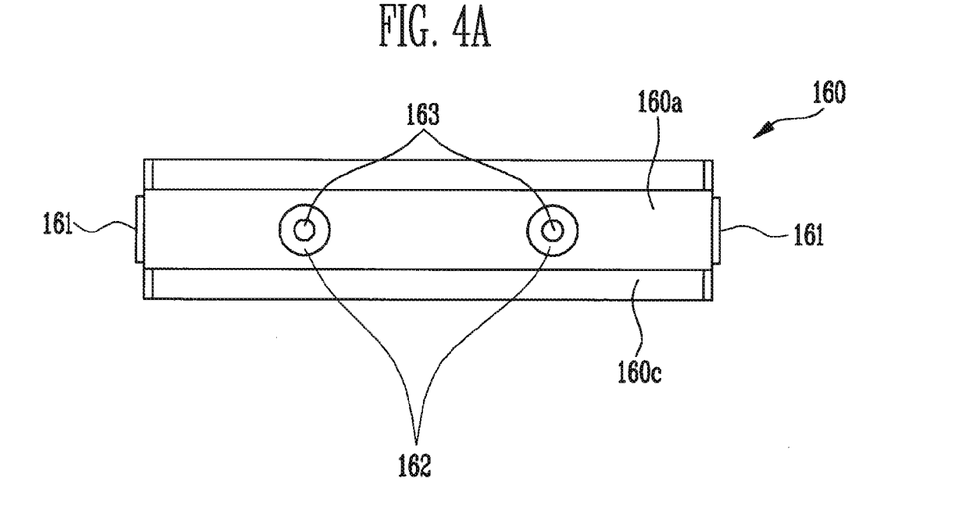
FIG. 4A is a top view of the reinforcement member of FIG. 3.
Figure 4B:
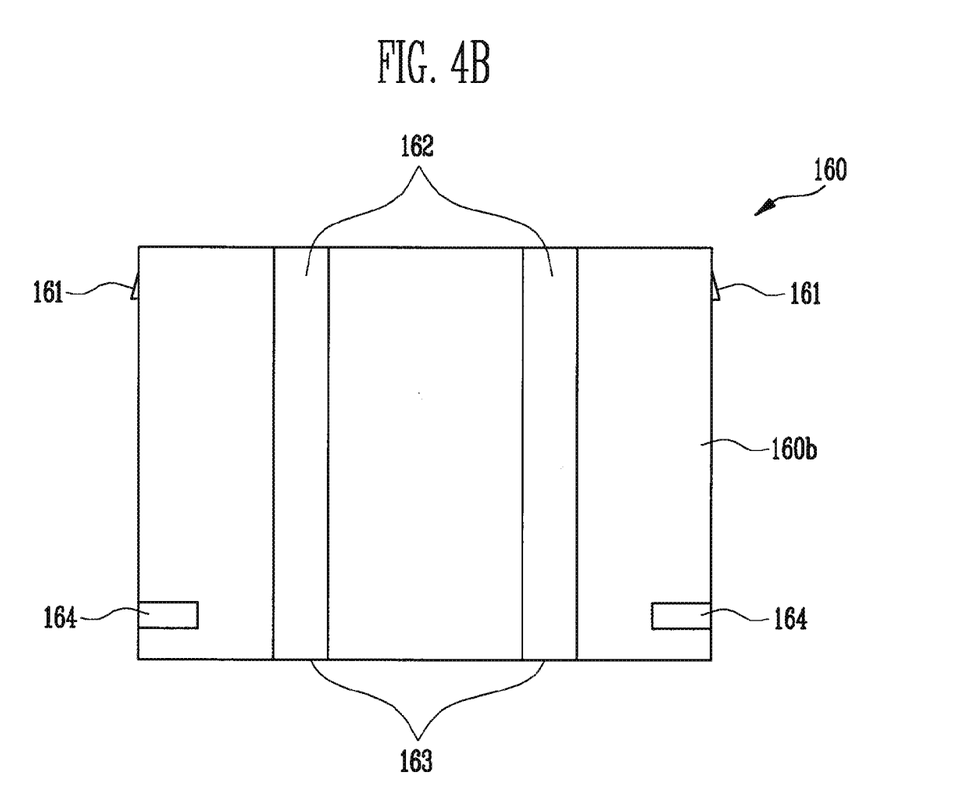
FIG. 4B is a front view of the reinforcement member of FIG. 3.

FIG. 4A is a top view of the reinforcement member 160; FIG. 4B is a front view of the reinforcement member 160; and FIG. 4C is a side view of the reinforcement member 160.

Figure 4C:
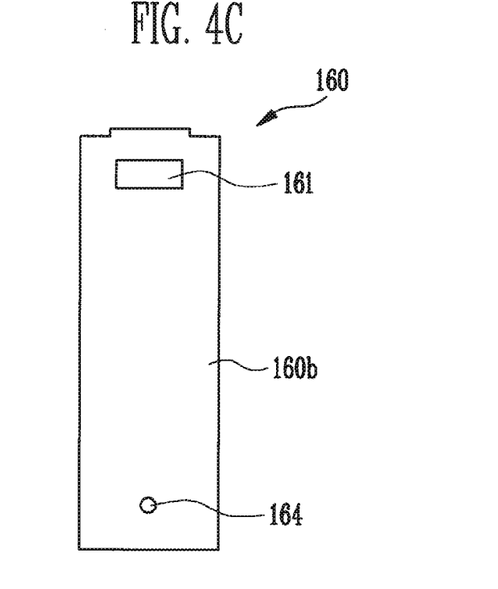
FIG. 4C is a side view of the reinforcement member of FIG. 3.

Referring to FIGS. 4A through 4C with FIG. 2, the insertion hole 162, which is penetrated from the upper surface 160a to the lower surface 160c of the reinforcement member 160, is a space in which a tool 170 (see FIG. 5) can be inserted for fixing the reinforcement member 160 to the housing 50. The first fixation member 146 fixed to the fixation unit 163 through the insertion hole 162 may be formed in the form of a bolt. Thereby, in order to pass the tool 170 or a bolt head of the first fixation member 146 through the insertion hole 162, the size of the insertion hole 162 of the upper surface 160a of the reinforcement member 160 is greater than the size of the fixation unit 163 of the lower surface 160c of the reinforcement member 160. In one embodiment, a bolt head of the first fixation member 146 should not be passed through the fixation unit 163 and therefore an opening through the fixation unit 163 is smaller than a bolt head of the first fixation member 146.

In one embodiment, the upper parts of both of the side surfaces 160b of the reinforcement member 160 are formed with the projection unit 161. The projection unit 161 may be accommodated in the projection accommodation unit 132 of the top flange unit 130b. Thereby, the reinforcement member 160 may be fixed to the top plate 130.

In one embodiment, the lower parts of both of the side surfaces 160b of the reinforcement member 160 are formed with the coupling groove 164. The coupling groove 164 is formed at a region corresponding to the coupling hole 143 of the bottom flange unit 140b, and the reinforcement member 160 is fixed to the bottom plate 140 by the second fixation member 144.

Figure 5:
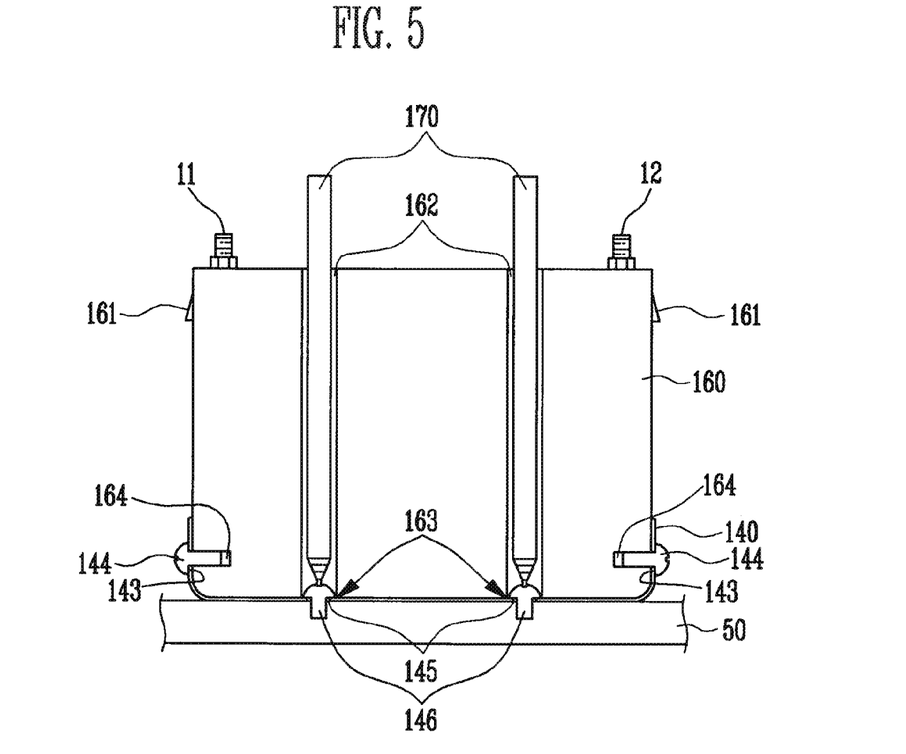
FIG. 5 is a cross-sectional view of the battery module of FIG. 1 along the line A-A', shown in a state where a reinforcement member is fixed to a bottom plate before a top plate is fixed.

FIG. 5 is a cross-sectional view of the battery module of FIG. 1 along the line A-A', shown in a state where the reinforcement member 160 is fixed to the bottom plate 140 before a top plate is fixed.

Referring to FIG. 5, the fixation unit 163 of the reinforcement member 160 may be fixed and located on the housing 50. The fixation unit 163 is located at the bottom portion of the insertion hole 162 formed in the reinforcement member 160 to fix the housing 50 to the bottom part of the reinforcement member 160. In one embodiment, as shown in FIG. 5, an insertion hole of the fixation unit 163 is penetrated from the upper surface to the lower surface and two insertion holes are separately formed at an interval (e.g., a predetermined interval).

In one embodiment, the first fixation member 146 and the tool 170 are inserted from the insertion hole 162, and the first fixation member 146 is fixed to the housing 50 after passing through the through-hole 145 of the bottom plate 140. Here, the through-hole 145 of the bottom plate 140 may be formed at a region corresponding to the fixation unit 163 of the reinforcement member 160. The first fixation member 146 may be a bolt or a stud.

As described above, as the reinforcement member 160 is fixed to the housing 50, when vibration or impact is applied to the battery module 100 in which the plurality of battery cells 10 are connected, the middle of the battery module 100 being floated and the battery module 100 being damaged are prevented or substantially prevented.

Figure 6:
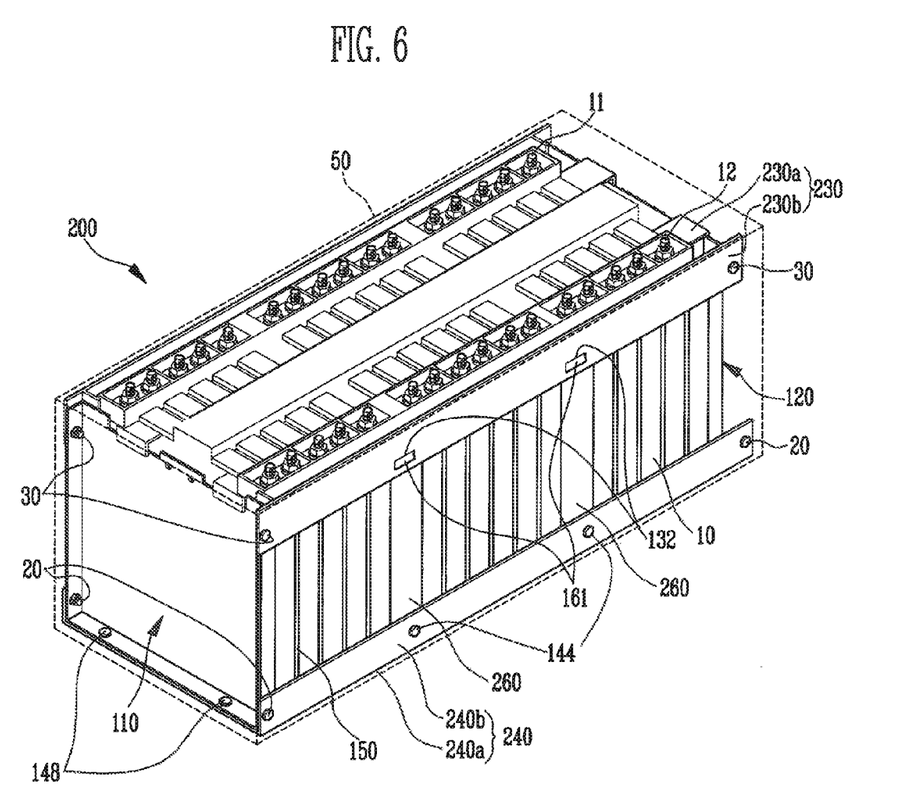
FIG. 6 is a perspective view of a battery module according to another embodiment of the present invention.

FIG. 6 is a perspective view of a battery module according to another embodiment of the present invention.

Referring to FIG. 6, according to another embodiment of the present invention, a battery module 200 includes a pair of end plates 110, 120, a plurality of battery cells 10, a top plate 230, a bottom plate 240 and a housing 50 which accommodates the above-mentioned components, like in the battery module 100 described above and shown in FIG. 1. In one embodiment, the top plate 230 includes a top base unit 230a and top flange units 230b, and the bottom plate 240 includes a bottom base unit 240a and bottom flange units 240b. In addition, two reinforcement members 260 are further provided between the plurality of battery cells 10 aligned in one direction.

Each of the reinforcement members 260 is located at a central region of a group of the plurality of battery cells 10 and includes the fixation unit 163 fixed to the housing 50. As such, when the number of the battery cells 10 is increased, two reinforcement members 260 may be provided at middle parts of the battery module 200 in order to prevent or substantially prevent a droop or sag of the middle part of the battery module 200 and improve an impact resistance.

The reinforcement member 260, in one embodiment, is formed such that a surface contacted with the battery cell 10 has the same size as the battery cell 10 and may include at least one insertion hole 162 which has a constant thickness and which is penetrated from the upper surface to the lower surface. In addition, both side surfaces and the lower surface of the reinforcement member 260 may be formed to be extended to portions of the lower surface and the side surfaces of both battery cells 10 contacted with the reinforcement member 260.

In one embodiment, both side surfaces of the reinforcement members 260 contacted with the bottom flange unit 240b are formed with the coupling groove 164, and the bottom flange unit 240b corresponding to the coupling grooves 164 is provided with coupling holes. In one embodiment, the coupling grooves 164 and the coupling holes of the bottom flange unit 240b are fixed by second fixation members 144.

In one embodiment, both side surfaces of the reinforcement members 260 contacted with the top flange unit 230b are formed with the projection unit 161, and the top flange unit 230b corresponding to the projection units 161 is formed with projection accommodation units 132 which accommodate the projection units 161. In one embodiment, the projection units 161 are formed having a tapered shape toward the lower part and may be easily coupled with the projection accommodation units 132.

In the battery module 200, according to an embodiment of the present invention, drooping or sagging of the middle part of the battery module 200 due to vibration or impact can be prevented or substantially prevented, and the battery module 200 is manufactured having robustness.

In the above embodiments, the battery module in which one or two reinforcement members are included is described as an example, but it will be apparent to those of ordinary skill in the art that more reinforcement members may be included where the number of battery cells is increased.

As described above, according to an aspect of embodiments of the present invention, a battery module is manufactured having robustness by inserting a reinforcement member into the battery module configured as a plurality of battery cells in order to prevent or substantially prevent drooping or sagging of the middle part of the battery module by vibration or impact. As such, a battery module according to embodiments of the present invention is particularly suited for application in an electric vehicle or a hybrid electric vehicle.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising;
  a pair of end plates;
  a plurality of battery cells aligned between the pair of end plates in a direction;
  a top plate at an upper side of the plurality of battery cells;
  a bottom plate at a lower side of the plurality of battery cells opposite the upper side;
  a housing accommodating each of the plurality of battery cells, the pair of end plates, the top plate, and the bottom plate, the housing comprising a lower portion at a lower portion of the bottom plate, the bottom plate being between the plurality of battery cells and the lower portion of the housing; and
  at least one reinforcement member between battery cells of the plurality of battery cells, the at least one reinforcement member including at least one fixation unit,
  wherein the at least one reinforcement member and the lower portion of the housing are fixed through a first fixation member, the first fixation member passing through a through-hole of the bottom plate.

2. The battery module according to claim 1, wherein the at least one fixation unit of the at least one reinforcement member is fixed to the housing.

3. The battery module according to claim 1, wherein the at least one reinforcement member is located at a middle part of the battery module.

4. The battery module according to claim 1, wherein the at least one reinforcement member includes a surface contacted with the battery cells and having a substantially same size as the battery cells, the at least one reinforcement member further including at least one insertion hole having a constant thickness and which is penetrated from an upper surface to a lower surface of the at least one reinforcement member.

5. The battery module according to claim 4, wherein opposite side surfaces and a lower surface of the at least one reinforcement member extend to portions of lower surfaces and opposite side surfaces of the battery cells contacted with the at least one reinforcement member.

6. The battery module according to claim 4, wherein the at least one fixation unit is located at a bottom part of the at least one insertion hole.

7. The battery module according, to claim 1, wherein the bottom plate corresponding to the at least one fixation unit has the through-hole through which the first fixation member is penetrated.

8. The battery module according to claim 1, wherein the first fixation member includes a bolt or a stud.

9. The battery module according to claim 1, wherein the top plate includes a top base unit facing upper surfaces of the battery cells, and a top flange unit bent from a side surface of the top base unit toward side surfaces of the battery cells.

10. The battery module according to claim 9, wherein, the at least one reinforcement member includes a projection unit on a side surface of the at least one reinforcement member contacted with the top flange unit.

11. The battery module according to claim 10, wherein the top flange unit corresponding to the projection unit has a projection accommodation unit which accommodates the projection unit.

12. The battery module according to claim 10, wherein the projection unit has a tapered shape toward the lower side of the plurality of battery cells.

13. The battery module according to claim 1, wherein the bottom plate includes a bottom base unit facing lower surfaces of the battery cells, and a bottom flange unit bent from a side surface of the bottom base unit toward side surfaces of the battery cells.

14. The battery module according to claim 13, wherein the at least one reinforcement member includes a coupling groove formed on a side surface of the at least one reinforcement member contacted with the bottom flange unit.

15. The battery module according to claim 14, wherein the bottom flange unit corresponding to the coupling groove has a coupling hole.

16. The battery module according to claim 15, wherein the side surface of the at least one reinforcement member and the bottom flange unit are fixed at the coupling groove and the coupling hole by a second fixation member.

17. The battery module according to claim 1, wherein the battery module is adapted for use as a motor-driving power source for propelling an electric vehicle or a hybrid electric vehicle.

\* \* \* \* \*